Sept. 9, 1969          H. FOX          3,465,654

DRAIN DEVICE

Filed July 17, 1967

*INVENTOR.*
HARRY FOX

BY *Julius L. Rubinstein*

*ATTORNEY*

United States Patent Office 3,465,654
Patented Sept. 9, 1969

3,465,654
DRAIN DEVICE
Harry Fox, 988 S. Sterne Drive,
Los Angeles, Calif. 90048
Filed July 17, 1967, Ser. No. 659,275
Int. Cl. E01c 11/50; F16l 9/12
U.S. Cl. 94—33                                6 Claims

ABSTRACT OF THE DISCLOSURE

This invention comprises an elongated plastic tube having a flat upper wall, side walls, and a bottom wall with a downwardly projecting rib. The side walls are provided with oppositely extending wings which extend parallel to, but below, the upper wall. The upper wall of the tube is provided with holes or slots disposed in some attractive arrangement. In use, the tube is embedded in the cement with the flat upper wall flush with the surface of the cement. The surface of the cement is gently sloped toward the flat upper wall of the tube so that water falling onto the cement flows onto the upper wall of the tube and from there through the slots into the interior of the tube for drainage. The side wings of the tube serve to prevent water from running down the outer surface of the tube to the ground below the cement. In addition, they provide a means for leveling the tubing so the upper surface of the tube is flush with the cement. The depending or downwardly projecting rib on the lower wall of the tube serves to produce and position a crack in the cement below the tube. This crack serves as a contraction joint for the cement.

This invention relates generally to a drain and more particularly to a combined drain, level, contraction joint, and water stop for slabs of cement or the like.

Brief summary

Heretofore, when constructing patios, walkways, and the like, it was necessary to provide vertical drain pipes beneath the cement or other hard surface. Horizontal pipes were laid beneath the cement and the vertical drain pipes communicated with the horizontal drain pipes to provide drainage. This arrangement created difficulties because the surface of the cement around the drain pipes had to be carefully shaped to permit the water to flow into the vertical drain pipes. The shaping of the cement around the vertical drains was time consuming and expensive, and this expense was multiplied by the number of drains which were necessary. Furthermore, when more than one drain was required, it was difficult to shape the cement around the drains so that they all had the same shape and any imperfection in shaping the drains marred the appearance of the finished cement.

This invention solves this problem by providing a plastic tube having a flat perforated upper wall. The tube is embedded in the cement with the flat upper wall generally coplanar with the surface of the cement. The cement adjacent the sides of the upper wall is sloped gently towards the perforated upper wall to channel water falling onto the cement over the upper wall. The tube is positioned at the correct level so that the upper wall of the tube is generally coplanar with the surface of the cement. This is accomplished by means of the longitudinally extending wings which rest on and are secured to positioning rods which are forced into the ground below the cement. A depending rib on the lower wall of the tube creates a crack in the cement as the cement dries. This crack is below the surface of the cement so it doesn't mar the finished surface and it serves as a contraction joint. In this way when the tube is laid in the cement, the tube, in addition to providing drainage, also serves to correctly position the contraction joint in the cement and provides a means for rapidly shaping the surface of the cement adjacent the tube.

Accordingly, a primary object of this invention is to provide a tubular drain pipe for cement slabs which serves to drain the cement and forms properly positioned contraction joints.

Still another object of this invention is to provide a drain pipe for cement slabs which is easy and inexpensive to install.

These and other objects of this invention will become more apparent when better understood in the light of the accompanying drawings and specification, wherein.

Figures 1, 2:
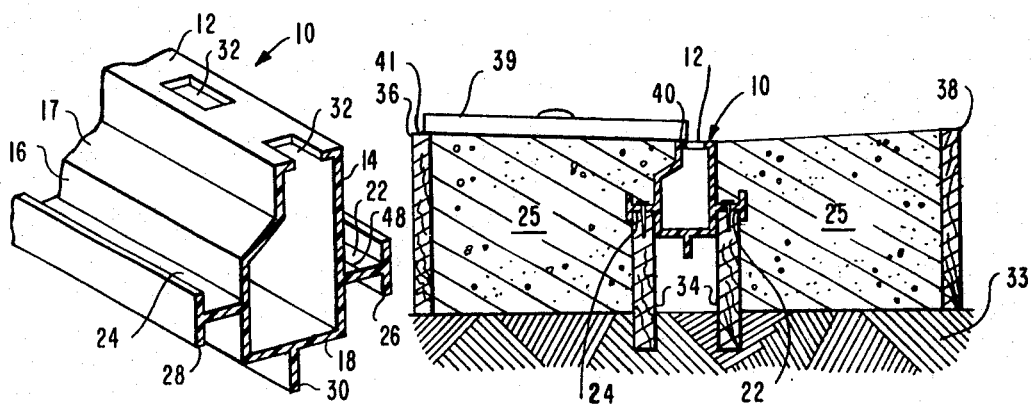
FIGURE 1 is a perspective view of a section of the plastic drain tube.
FIGURE 2 is an elevational view of the drain pipe showing it embedded in the cement and showing its added function as a level guide for the slope of the cement.

Referring now to FIGURE 1 of the drawing, the drain tube 10 is formed from plastic or other suitable material. The tube has a planar upper wall 12 and depending side walls 14 and 16. Side wall 14 depends vertically from the upper wall 12 directly to the bottom wall 18, which in the embodiment shown is planar. However, side wall 16 is shaped to provide a lateral offset portion 17. This is to permit the tube 10 to have sufficient volume for drainage without increasing the width of the top wall 12 which would mar the appearance of the work. The tube is provided with integral oppositely extending wings 22 and 24. These wings terminate in vertical ribs 26 and 28. In addition, an integrally formed rib 30 extends downwardly from bottom wall 18 for reasons to be described below. Slots or holes 32 are formed in the upper wall 12 to permit the water to flow into the tube. In the embodiment shown the slots or holes are disposed in uniformly spaced relationship. However, it is understood that any attractive configuration may be used.

The tube 10 is inserted in the cement 25 or other suitable material used to make the hard surface when the cement is poured. It is important that the upper surface 12 of the tube generally be flush with the surface of the cement to permit water on the surface of the cement to flow into the tube for drainage. To make certain the tube 18 is at the correct level, pegs 34 are driven into the ground 33 before the cement is poured and the ribs 22 and 24 are nailed to the top ends of these pegs. The size of these pegs is selected so that when the wings rest on them the upper wall 12 of the tube 10 will be at the correct level. Thereafter, the cement is poured and is confined between the forms 36 and 38 in a manner well known in the art (see FIGURE 2). When the cement poured is at the desired thickness, the grading stick 39 is used, resting on edge 40 of the tube 10 and on the edge 41 of the form to provide a barely perceptible 2½ degree slope from the edge to the form to the upper wall 12 of the tube. This gentle slope channels the water falling onto the surface of the cement onto the perforated upper wall 12 of tube 10 from which it flows through the slots 32 to the interior of the tube. For purposes of illustration, the slope is shown somewhat exaggerated in FIGURE 2.

It can be seen that by pulling the grading stick 39 along the above-described edges of the form and the upper edge 12 of the tube, the entire surface of the cement can be quickly leveled and provided with the required slope for drainage. Thus, it can be seen that the tube 10 by means of the integral wings 22 and 24 serves a combined function in that it both provides drainage and helps serve to level and grade the upper surface of the cement.

Figures 3, 4:
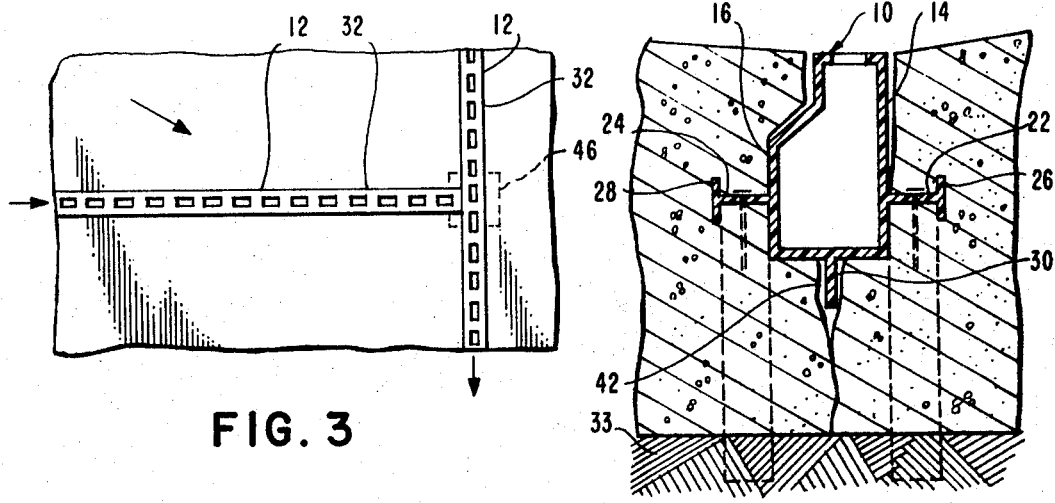
FIGURE 3 is a plan view of the drain pipe embedded in the cement.
FIGURE 4 is an elevational view showing the drain pipe in position in the hardened cement and showing the action of the drain pipe in forming contraction joints.
Figure 5:
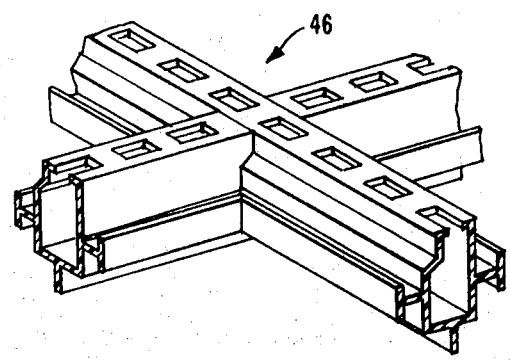
FIGURE 5 is a perspective view of a connector for joining a number of drains together.

As the cement hardens it contracts away from the walls of tube 10 (see FIGURE 4). This could permit water to flow down the outside of the walls 14 and 16 through cracks 42 from where it could ultimately reach ground 33 beneath the cement. If this happened, the ground would swell and cause the cement to crack. To prevent this from happening, the wings 22 and 24, along with ribs 26 and 28, serve as a water stop to prevent the water flowing down the sides of the tube from reaching the ground 33.

In addition, when laying cement or other hard surfaces, means must be provided for permitting expansion and contraction of the slab due to temperature changes. This requires a contraction joint. In the present invention, the tube 10 helps produce contraction joints by means of rib 30. This rib generates the crack 42 below the surface of the cement below the wall 18 which functions as the required expansion joint. In this way the hardened cement will be able to tolerate expansion and contraction caused by temperature changes without forming surface cracks which would mar the appearance of the cement.

If circumstances require, more than one drainage tube can be connected together beneath the cement by means of connectors 46 to better effect drainage of the cement (see FIGURES 3 and 4). Furthermore, wing 22 is designed to be cut off when it is desired that wall 14 of the tube 10 lie flush against an upstanding vertical wall. To expedite the removal of wing 24, the wing may be provided with a score line 48.

In summary, it can be seen that tube 14 has several functions. It can be quickly and easily laid to serve as a drainage pipe and its upper surface serves as a guide for grading stick 39 for quickly and easily grading and leveling cement and channeling the slope of the cement toward the perforated upper wall 12 of the tube. In addition, the wings of the tube both serve to hold the tube at the desired level when the cement is poured, and in addition, they function as a water stop. Finally, the depending rib 30 on the bottom wall 18 of the tube serves to form and locate cracks in the hardened cement which serve as contraction joints for the slab.

Obviously many modifications and variations of the present invention are possible in the light of the above teachings. It is therefore to be understood that within the scope of the appended claims the invention can be practiced otherwise than as specifically described.

I claim:
1. A tubular drain pipe of the class described comprising a planar upper wall and depending side walls, said upper wall having drain holes formed therein to permit water to flow therethrough into said drain pipe, oppositely extending wings integrally secured to said side walls, said wings extending parallel to said upper walls both for positioning the upper wall of the drain pipe at a desired level and for serving as a water stop, a bottom wall, a downwardly projecting rib on said bottom wall for producing a contraction joint crack in the cement when the drain pipe is inserted and the cement hardens around the drain pipe.

2. The drain pipe described in claim 1 wherein one side wall extends directly from said planar upper wall to said bottom wall and the other side wall includes an offset portion to increase the volume of said drain pipe while retaining a narrow upper wall, a wing attached to said one side wall, said wing provided with a score line to permit the wing to be easily and quickly torn off when the said one side wall is to be embedded in cement with said one side wall abutting a vertical wall.

3. The drain pipe described in claim 2 wherein said drain pipe is formed from plastic and the entire drain pipe is extruded in one piece.

4. A tubular drain pipe of the class described formed from an extruded plastic material, said drain pipe having side walls, a perforated planar upper wall and a bottom wall, downwardly projecting crack inducing formations integrally with the bottom wall formed on the bottom wall whereby when said tubular drain pipe is embedded in cement and the cement hardens around the drain pipe, the formations integrally formed on the bottom wall form contraction joint cracks below the top surface of the cement.

5. A tubular drain pipe of the class described formed from an extruded plastic material, said drain pipe comprising a planar upper wall, depending side walls, and a bottom wall, said upper wall having drain holes formed therein to permit water to flow therethrough into said drain pipe, oppositely extending wings integrally secured to said side walls, said wings extending parallel to said upper wall both for positioning the upper wall of the drain pipe at a desired level and for serving as a water stop, downwardly projecting crack inducing formations integrally formed with the bottom wall whereby when said drain pipe is inserted in the cement and the cement hardens around the drain pipe the crack inducing formations on the bottom wall form contraction joint cracks below the surface of the cement.

6. A tubular drain pipe of the class described having a perforated planar upper wall and a bottom wall, downwardly projecting crack inducing formations integrally formed on the bottom wall of said drain pipe whereby when said drain pipe is embedded in cement and the cement hardens around the drain pipe the crack inducing formations on the bottom wall form contraction joint cracks in the cement below its surface.

References Cited

UNITED STATES PATENTS

| | | | |
|---|---|---|---|
| 329,342 | 10/1885 | Sutton | 94—31 |
| 2,386,020 | 10/1945 | Wendelken | 94—33 |
| 2,508,443 | 5/1950 | Carter | 94—18 |
| 2,701,027 | 2/1955 | Scoville | 94—33 X |
| 3,001,001 | 9/1961 | Bibb | 52—221 X |
| 3,274,906 | 9/1966 | Worson et al. | 94—18 X |

JACOB L. NACKENOFF, Primary Examiner

U.S. Cl. X.R.

52—220; 94—18; 138—157